(12) United States Patent
Nosaka

(10) Patent No.: US 6,945,061 B2
(45) Date of Patent: Sep. 20, 2005

(54) CONTROL UNIT FOR VARIABLE DISPLACEMENT COMPRESSORS

(75) Inventor: Michiyasu Nosaka, Anjyo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/435,025

(22) Filed: May 12, 2003

(65) Prior Publication Data

US 2003/0213255 A1 Nov. 20, 2003

(30) Foreign Application Priority Data

May 14, 2002 (JP) ........................................ 2002-138599

(51) Int. Cl.$^7$ .............................................. F04B 49/00
(52) U.S. Cl. .......................... 62/175; 62/229; 62/323.1
(58) Field of Search .......................... 62/175, 510, 229, 62/228.5, 323.1; 236/1 EA

(56) References Cited

U.S. PATENT DOCUMENTS 2,242,588 A * 5/1941 McGrath .................. 62/510 X
2,296,741 A * 9/1942 Sanders, Jr. ............... 62/510 X

FOREIGN PATENT DOCUMENTS

JP A-2000-220577 8/2000 ........... F04B/49/06

* cited by examiner

Primary Examiner—Harry B. Tanner
(74) Attorney, Agent, or Firm—Posz Law Group, PLC

(57) ABSTRACT

A control unit for variable displacement compressors is used for two independent air conditioning cycles, wherein two compressors 1, 11 driven by a common external drive source 8 include electromagnetic displacement control valves 6, 16, respectively. By controlling these control valves by ECU 7, the displacement of the compressor is variable. When the air temperature is higher than a predetermined temperature $T_0$, both of the compressors are subjected to the variable displacement operation even though one of them is unnecessary for the air conditioning operation. On the contrary, if the outer air temperature is lower than the predetermined temperature, only one compressor, needed for the air conditioning operation, is subjected to the variable displacement operation, while the other compressor is subjected to the minimum displacement operation.

6 Claims, 3 Drawing Sheets

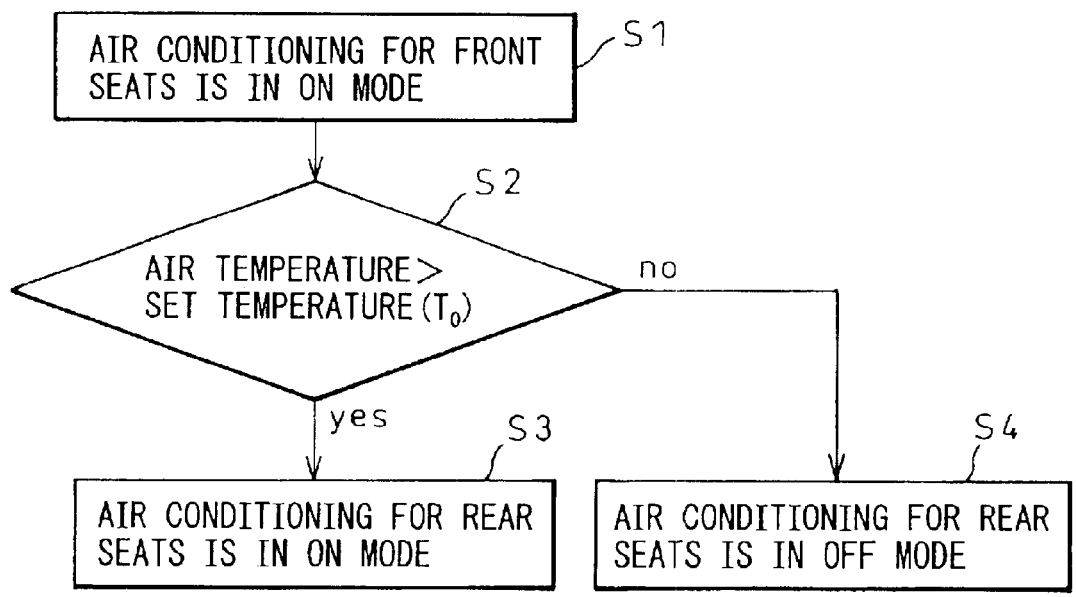

CONTROL UNIT FOR VARIABLE DISPLACEMENT COMPRESSORS

BACKGROUND OF THE INVENTION

1. Field of the Invention

The present invention relates to a control unit for two variable displacement compressors used for two independent air-conditioning systems.

2. Description of the Related Art

In the prior art, a variable displacement compressor of a regularly operative type for an air-conditioner of a vehicle, which is regularly operative by a power from an engine provided the engine is driven, is known from Japanese Unexamined Patent Publication (Kokai) No. 2000-220577. This compressor is capable of optionally changing the operating displacement in a range of approximately 0% to 100% by electric signals from an electronic control unit (ECU) in accordance with various operating conditions. When the air conditioning in a passenger compartment is necessary, the compressor is switched to an ON mode in which a coolant is compressed by the compressor based on the signal from ECU and discharged to an air-conditioning cycle. If the air conditioning in the passenger compartment is unnecessary, the compressor is switched to an OFF mode, which is a minimum displacement operation, and no coolant is discharged to the air conditioning cycle.

While sliding portions in the interior of the compressor usually become hot due to self-heating during the operation, in the case of the ON mode, the sliding portions are cooled because coolant at a low temperature is sucked from the air conditioning cycle into the compressor. On the other hand, in the case of the OFF mode, in which no air conditioning is carried out, as no coolant is sucked from the air conditioning cycle into the compressor, the interior sliding portions of the compressor are not cooled by the coolant. When the air is at a relatively low temperature, the compressor is usually driven in the OFF mode as the passenger requires no air conditioning. However, the interior temperature of the compressor does not rise to a dangerous value because the outer air temperature is low. Conversely, in an environment with a high air temperature, the compressor is driven in the ON mode because the air conditioning is usually necessary, and the compressor temperature does not rise to an extraordinary high value.

However, in a case of a large-sized vehicle such as a limousine having two air conditioning systems using two compressors, completely independent from each other, in which one compressor is used for the front seats and another compressor is used for the rear seats, the compressor for the rear seats may be operated in the OFF mode when the air temperature is high but there are no passengers in the rear seats. When the compressor is driven in the OFF mode at such a high air temperature, no cooling effect is obtainable from a returning coolant from the air conditioning cycle. Thus, the temperature of the compressor reaches a dangerous temperature due to self-heating to result in the seizing of the compressor in the worst case.

SUMMARY OF THE INVENTION

The present invention has been made to solve the above-mentioned problems in the prior art, and an object thereof is to provide a control unit for two variable displacement compressors directly coupled to a common external drive source and used for two completely independent air conditioning systems, which control unit is capable of preventing the compressor temperature from rising to a dangerous value by the self-heating due to the OFF mode operation of the compressor and from a resulting seizing of the compressor when the air temperature is at a predetermined value or higher.

According to the present invention, in an air-conditioner having at least two variable displacement compressors directly coupled to a common external drive source and used for at least two independent air conditioning cycles, provision is mode of a control unit for the variable displacement compressors which comprises detection means for detecting the air conditioning state of one of the two variable displacement compressors wherein, when the detection means detects a predetermined condition, both of the compressors are subjected to the variable displacement operation even though the only air conditioning operation of the other variable displacement compressor is necessary.

Thereby, irrespective of whether or not the air conditioning operation is necessary, when one of the air conditioning systems is operated, the other system is also operated so that seizing of the compressor due to self-heating of the compressor is avoided due to the cooling effect of the returning coolant.

In the present invention, the detection means is preferably means for detecting the air temperature, and the predetermined condition is that the air temperature is higher than a predetermined value.

The present invention may be more fully understood from the description of the preferred embodiments of the invention, as set forth below, together with the accompanying drawings.

BRIEF DESCRIPTION OF THE DRAWINGS

In the drawings:

FIG. 3 is a flow chart for controlling the control unit for the variable displacement compressor according to one embodiment of the present invention.

DESCRIPTION OF THE PREFERRED EMBODIMENTS

Figure 1:
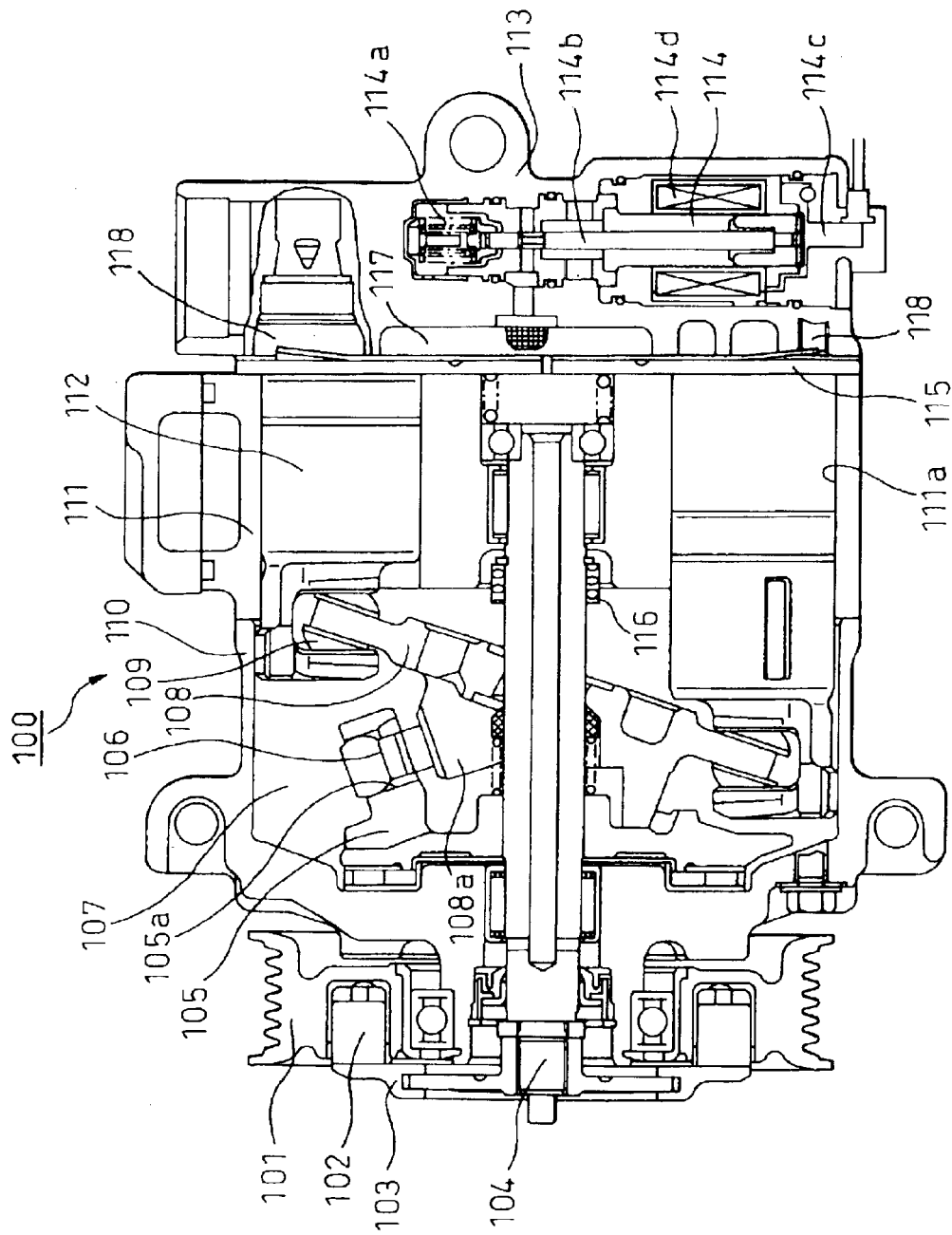
FIG. 1 is a sectional view of a swash plate type variable displacement compressor.

The control unit for the variable displacement compressor according to the embodiment of the present invention will be described below with reference to the attached drawings. FIG. 1 is a sectional view of a variable displacement compressor of a regularly operative type. The variable displacement compressor 100 of this type is adapted to be regularly operative by a power from an external drive source 8 provided the external drive source 8 such as an engine is in an ON mode.

As shown in FIG. 1, a front housing 110 is coupled to a front end of a cylinder block 111, and a rear housing 113 is fixedly coupled to a rear end of the cylinder block 111 via a plate member 115 such as a valve plate or a valve-forming plate. A rotary shaft 104 is supported for rotation by the front housing 110 and the cylinder block 111 defining a crank chamber 107. A shock absorber 102 having a pulley 101 and a hub 103 is fastened by bolts or the like to the rotary shaft 104 projected outward from the crank chamber 107 through the shock absorber 102. Power is transmitted from the external drive source such as a vehicle engine to the pulley 101 via a belt (not shown) or the like and further to the rotary shaft 104.

A lug plate 105 is made integral with the rotary shaft 104 by, for example, press-fitting or others, and a swash plate 108 is supported by the rotary shaft 104 to be slidable in the axial direction thereof and tiltable thereto. A connecting piece 108a is fixed to the swash plate 108 and a guide pin 106 is integral with the connecting piece 108a by a press-fit or others. A guide hole 105a is formed in the lug plate 105, and a head of the guide pin 106 is inserted into the guide hole 105a in a slidable manner. The swash plate 108 is tiltable in the axial direction of the rotary shaft 104 in association with the guide hole 105a and the guide pin 106 and is rotatable together with the rotary shaft 104.

When a center portion of the swash plate 108 moves toward the cylinder block 111, the inclination angle of the swash plate 108 increases. The maximum inclination angle of the swash plate 108 is limited by the contact of the lug plate 105 with the swash plate 108. The minimum inclination angle of the swash plate 108 is limited by the contact of the swash plate 108 with a circlip 116 provided on the rotary shaft 104.

In a plurality of cylinder bores 111a formed in the cylinder block 111, pistons 112 are accommodated. The rotary motion of the swash plate 108 is converted to the forward and rearward reciprocation of the pistons 112, whereby the respective piston 112 is slidable along the cylinder bore 111a forward and rearward. Accordingly, there are main sliding portions of this compressor 100 between the swash plate 108 and the shoe 109 and between the piston 112 and the bore 111a.

In the rear housing 113, a suction chamber 117 and a discharge chamber 118 are defined. In the plate member 115 interposed between the cylinder block 111 and the rear housing 118, such as a valve sheet or a valve-forming plate, a suction valve and a discharge valve are formed. Accordingly, a gasous coolant in the suction chamber 117 pushes back the suction valve due to the returning motion of the piston 112 and flows into the cylinder bore 111a. The gasous coolant thus flowing into the cylinder bore 111a pushes back the discharge valve due to the advancing motion of the piston to be discharged into the discharge chamber 118.

Figure 2:
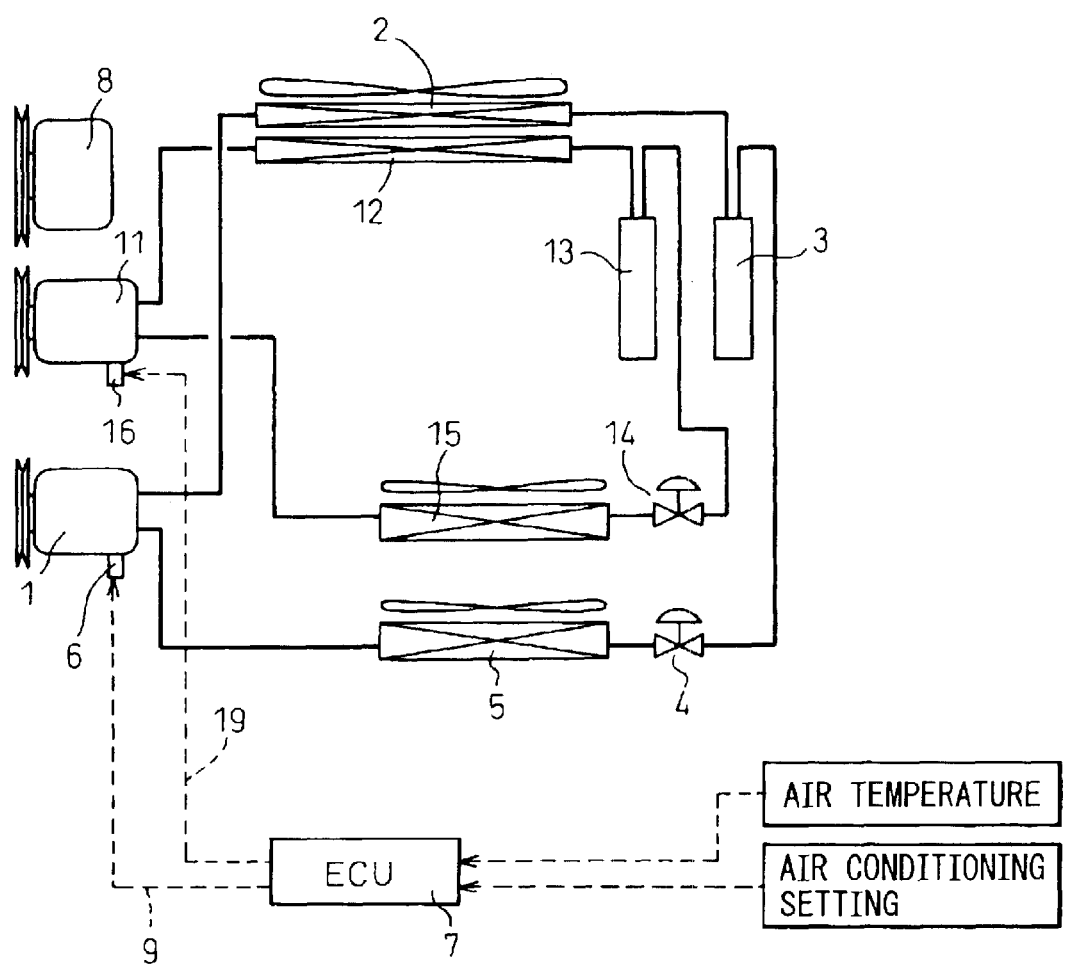
FIG. 2 illustrates an entire structure of an air conditioning system having two independent air conditioning cycles using two variable displacement compressors.

In a pressure supplying path connecting the discharge chamber 118 to the crank chamber 107, an electromagnetic type displacement control valve 114 is provided. This pressure supplying path is a path for supplying a coolant in the discharge chamber 118 which is a discharging pressure area to the crank chamber 107. On a bellows 114a within the displacement control valve 114 which is a pressure-sensitive means, the pressure in the suction chamber 117 (a suction pressure) is applied. The suction pressure within the suction chamber 117 is influenced by a heat load. A valve body 114b is connected to the bellows 114a and opens or closes a valve hole 114c. A spring force of a spring in the bellows 114a acts on the valve body 114b in a direction to open the valve hole 114c. An electromagnetic drive force of a solenoid 114d in the displacement control valve 114 biases the valve body 114b to close the valve hole 114c against the spring force. The electric current supplied to the solenoid 114d is controlled by an electronic control unit (ECU) 7 as shown in FIG. 2.

ECU 7 supplies the electric current to the solenoid 114d when a switch for operating an air conditioning system is in an ON state, and stops the electric current when the switch is in an OFF state. An electric signal from ECU 20, which becomes a control current for the solenoid 114d, is determined by processing, in the ECU 7, an air conditioning environment such as a passenger compartment temperature, a solar radiation or an outer air temperature; a condition for operating an air conditioner such as an operating switch, an air conditioner operative mode or a set temperature; and a vehicle environment such as an engine rotational speed, or an opening degree of accelerator. An opening degree of the displacement control valve 114 is determined by a balance between an electromagnetic drive force generated from the solenoid 114d, a spring force and a bias of the bellows. Accordingly, the displacement control valve 114 carries out the control for generating a suction pressure in correspondence to the current value supplied to the solenoid 114d.

As the current value supplied to the solenoid 114d becomes higher, the opening degree of the displacement control valve 114 becomes smaller to reduce an amount of coolant supplied from the discharge chamber 118 to the crank chamber 107. As the coolant in the crank chamber 107 flows to the suction chamber 117 via a pressure-release path, the interior pressure in the crank chamber 107 is lowered. Accordingly, an inclination angle of a swash plate 108 becomes larger to increase a discharged amount of the coolant. The increase of the discharging amount results in the lowering of the suction pressure. When the current value supplied to the solenoid 114d becomes lower, the opening degree of the displacement control valve 114 becomes larger to increase the amount of the coolant supplied from the discharge chamber 118 to the crank chamber 107. Accordingly, the interior pressure of the crank chamber 107 rises to decrease the inclination angle of the swash plate 108 and reduce the discharge amount of the coolant. The reduction of the discharge amount results in the increase of the suction pressure.

If the current value supplied to the solenoid 114d becomes zero, that is, when the compressor 100 is operated in an OFF mode, the opening degree of the displacement control valve 114 is maximum and the inclination angle of the swash plate is minimum. When the inclination angle of the swash plate 108 becomes minimum, the coolant suction path is closed to interrupt the circulation of the coolant through an external coolant circuit, whereby the cooling of the passenger compartment is not carried out. When the current is supplied again to the solenoid 114d, the opening degree of the valve becomes smaller to lower the pressure in the crank chamber 107, and the inclination angle of the swash plate 108 increases from the minimum value. As the inclination angle of the swash plate 108 increases from the minimum value, the suction path is opened and the coolant flows from the suction path to the suction chamber 117, whereby the circulation of the coolant through the external coolant circuit is started again to carry out the cooling of the passenger compartment.

FIG. 2 illustrates an entire structure of two completely independent air conditioning systems using two variable displacement compressors. These first and second compressors 1 and 11 are connected via belts or others (not shown) to the external drive source 8 such as an engine from which power is transmitted.

The first air conditioning system forms an air conditioning cycle for circulating a hot and high pressure gaseous coolant discharged from the first compressor 1 through an external coolant circuit sequentially consisting of a first condenser 2, a first receiver 3, a first expansion valve 4 and first evaporator 5, and returning to the first compressor 1.

The second air conditioning system forms an air conditioning cycle for circulating a hot and high pressure gaseous coolant discharged from the second compressor 11 through an external coolant circuit sequentially consisting of a second condenser 12, a second receiver 13, a second expansion valve 14 and second evaporator 15, and returning to the second compressor 11. As the function of the coolant is well-known in the air conditioning cycle, the explanation thereof will be eliminated.

The first electromagnetic displacement control valve 6 in the first compressor 1 and the second electromagnetic displacement control valve 16 in the second compressor 11 are respectively controlled by electric signals 9, 19 from the electronic control unit (ECU) 7. The air conditioning environment such as the air temperature, the condition for operating (setting) the air conditioner such as an operating switch or a set temperature and the vehicle environment such as an engine rotational speed are input into ECU 7 and processed therein to output electric signals 9, 19 to the displacement control valves 6, 16, respectively.

When the air conditioning system is operated in the ON mode by using the above-structured variable displacement compressors 1, 11 and 100; that is, when the variable displacement control valves 6, 16 and 114 are driven by ECU 7 to increase the inclination angle of the swash plate 108 in the respective compressor from the minimum value so that the coolant circulates the external coolant circuit, sliding portions in the compressor, for example, between the swash plate 108 and a shoe 109 or between a piston 112 and a cylinder bore 111a are heated by the sliding motion. However, this heat generation is cooled by the coolant returning from the air conditioning cycle. On the other hand, in the OFF mode (the minimum displacement operation) of the compressors 1, 11 and 100 in which no air conditioning operation is necessary, that is, when the displacement control valves 6, 16, 114 are not driven and the inclination angle of the swash plate 108 is a minimum to interrupt the circulation of the coolant through the external coolant circuit, the effect for cooling the heated sliding portions is not obtainable by the coolant returning from the air conditioning cycle. However, as the outer air temperature is low in an environment requiring no air conditioning, the compressor does not reach a dangerous zone in which the sliding portions are seized by self-heating.

However, as shown in FIG. 2, in a case of a large-sized vehicle having two independent air conditioning cycles, a first air conditioning system for the front seats and a second air conditioning system for the rear seats may be mounted to the vehicle. When the air temperature is relatively high and there is no passenger other than a driver in the vehicle, the first air conditioning system must be operated as the driver needs the air conditioning, whereby the first compressor 1 is operated in the ON mode. That is, the electric signal 9 is sent from ECU 7 to the first electromagnetic type displacement control valve 6 and the first compressor 1 carries out the variable displacement operation to circulate the coolant through the external coolant circuit thereof. Therefore, while the sliding portions of the first compressor 1 are cooled by the returning coolant in the first air conditioning system, the second air-conditioning system for the rear seats is not operative as there are no passengers and the second compressor 11 is operated in the OFF mode. That is, no electric signal 19 is sent from ECU 7 to the second electromagnetic type displacement control valve 16 and the second compressor 11 carries out the minimum displacement operation, in which no coolant is supplied to the external coolant circuit thereof. Therefore, even though the air temperature is high, the second compressor 11 is not cooled by the coolant returning from the air conditioning cycle and is forced to be driven at a high temperature due to self-heating, whereby the sliding portions of the second compressor 11 may reach to a high temperature state and may be in an oil-film broken state to result in seizing.

To solve such a problem, the control unit for the variable displacement compressor according to one embodiment of the present invention controls the operation of the air conditioning system in accordance with a control flow shown in FIG. 3. For example, if a driver is a sole passenger of the vehicle, to operate the first air conditioning system for the front seats, the first electromagnetic type displacement control valve 6 is initially driven by the electric signal 9 from ECU 7 to drive the first compressor 1 in the ON mode at step S1. Then, at step S2, it is determined by ECU 7 whether or not the air temperature is higher than a predetermined value $T_0$. If the answer is affirmative, the routine proceeds to step S3 at which the electric signal 19 is sent from ECU 7 to the second electromagnetic displacement control valve 16 which is driven thereby to operate the second compressor 11 in the ON mode, whereby the second air conditioning system for the rear seats is operated. Contrarily, if the answer is negative, the routine proceeds to step S4, at which the second air conditioning system for the rear seat is not operated and the second compressor 11 is maintained in the OFF mode.

In such a manner, according to the present invention, as a control system in which, when the outer air temperature is higher than the predetermined temperature $T_0$ and the driver uses the air conditioning system, the second air conditioning system for the rear seats is operated by issuing the electric signal 19 from ECU 7 irrespective of whether or not there are passengers in the rear seats so that the second compressor 11 is operated in the ON mode, is adopted, it is possible to avoid the seizing of the sliding portions of the compressor and maintain the reliability thereof.

While the present invention has been described by reference to specific embodiments chosen for the purposes of illustration, it should be apparent that numerous modifications could be made thereto by those skilled in the art without departing from the basic concept and scope of the invention.

What is claimed is:

1. In an air-conditioner having at least two variable displacement compressors directly coupled to a common external drive source and used for at least two independent air conditioning cycles, a control unit for the variable displacement compressors, comprising detection means for detecting the air conditioning state in the air conditioner, wherein, when the detection means detects a predetermined condition, both of the compressors are subjected to the variable displacement operation even though only the air conditioning operation of one of the variable displacement compressors is necessary.

2. The control unit as defined by claim 1, wherein the detection means is means for detecting the air temperature, and the predetermined condition is that the air temperature is higher than a predetermined value.

3. An air conditioning system for a vehicle comprising:
a first air conditioning circuit including a first variable displacement compressor, wherein a first control valve controls the displacement of the first variable displacement compressor such that the first compressor can be operated in an off-state, in which no air conditioning is performed, and an on-state, in which air-conditioning is performed;
a second air conditioning circuit including a second variable displacement compressor, wherein a second control valve controls the displacement of the second variable displacement compressor such that the second variable displacement compressor can be operated in an off-state, in which no air conditioning is performed, and an on-state, in which air-conditioning is performed, and wherein the first and second variable displacement compressors are driven by a common drive source;

a sensor for detecting a predetermined condition of the air conditioning system;

a controller for sending a control signal to each of the control valves, wherein the controller causes both the first and the second variable displacement compressor to be in the on-state if one of the first and second variable displacement compressors is controlled to perform air conditioning by a passenger and if the sensor detects that the predetermined condition exists.

4. The air conditioning system according to claim 3, wherein the predetermined condition is the environmental air temperature of the vehicle, and the predetermined condition is a condition in which the environmental air temperature exceeds a predetermined temperature.

5. An air conditioning system for a vehicle comprising:
a first air conditioning circuit including a first variable displacement compressor, wherein the displacement of the first variable displacement compressor varies between an off-state, in which no air conditioning is performed, to an on-state, in which air-conditioning is performed;

a second air conditioning circuit including a second variable displacement compressor, wherein the displacement of the second variable displacement compressor varies between an off-state, in which no air conditioning is performed, to an on-state, in which air-conditioning is performed, and wherein the first and second variable displacement compressors are driven by a common drive source;

a sensor for detecting a predetermined condition of the air conditioning system;

means for controlling each of the first and second variable displacement compressors so that both the first and the second variable displacement compressor are in the on-state if one of the first and second variable displacement compressors is controlled to perform air conditioning by a passenger and if the sensor detects that the predetermined condition exists.

6. The air conditioning system according to claim 5, wherein the predetermined condition is the environmental air temperature of the vehicle, the sensor is an air-temperature sensor, and the predetermined condition is a condition in which the environmental air temperature exceeds a predetermined temperature.

* * * * *